Figure 1:
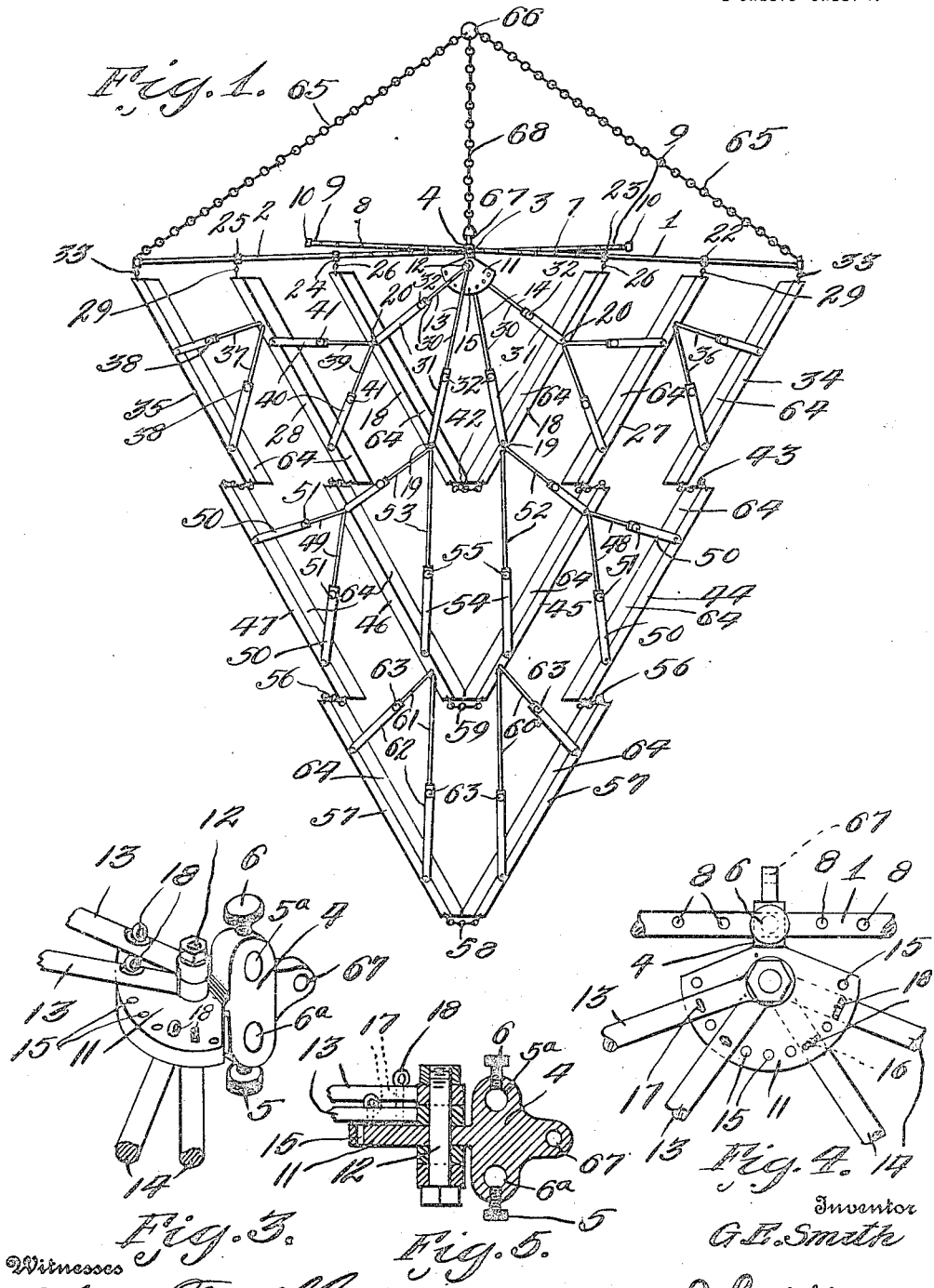

G. E. SMITH.
ROAD DRAG OR GRADER.
APPLICATION FILED MAR. 11, 1915.

1,151,835.

Patented Aug. 31, 1915.
2 SHEETS—SHEET 2.

Inventor
G. E. Smith

UNITED STATES PATENT OFFICE.

GEORGE EDWARD SMITH, OF HUDSON, COLORADO.

ROAD DRAG OR GRADER.

1,151,835.     Specification of Letters Patent.     Patented Aug. 31, 1915.

Application filed March 11, 1915. Serial No. 13,651.

*To all whom it may concern:*

Be it known that I, GEORGE E. SMITH, a citizen of the United States, residing at Hudson, in the county of Weld and State of Colorado, have invented a new and useful Road Drag or Grader; and I do hereby declare the following to be a full, clear, and exact description of the invention, such as will enable others skilled in the art to which it appertains to make and use the same.

This invention relates to an improved road drag or grader, and an object of the invention is to provide a machine of this design comprising a plurality of angularly arranged bars having road grading or scraping blade on their under faces, and so connected relative to each other as to permit them to be adjusted toward and from each other, whereby the machine may be used for grading or scraping wide or narrow roads.

In practical fields the details of construction may necessitate alterations, falling within the scope of what is claimed.

The invention comprises further features and combination of parts, as hereinafter set forth, shown in the drawings and claimed.

Figures 2, 6, 7:
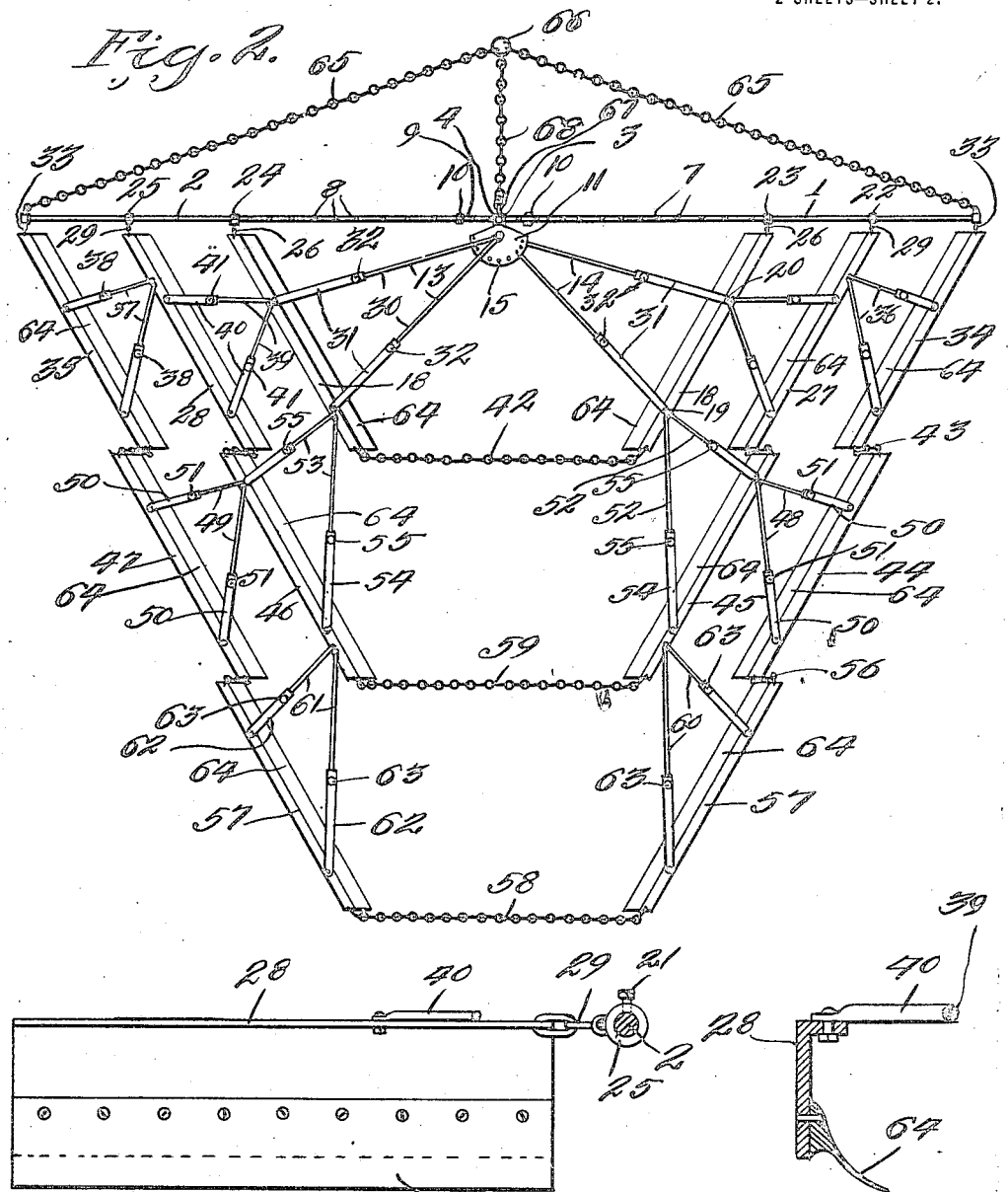

In the drawings:—Figure 1 is a plan view of the improved road drag constructed in accordance with the invention and showing the same adjusted for grading a narrow road. Fig. 2 is a plan view showing the drag adjusted for grading a wide road. Figs. 3 and 4 are detail views showing the connections between one or two of the angularly disposed bars, whereby they may be adjusted. Fig. 5 is a sectional view through Fig. 3. Fig. 6 is a detail view of one of the scrapers 64 showing its attendant parts. Fig. 7 is a sectional view through Fig. 6.

Referring more especially to the drawings, 1 and 2 designate a pair of heavy rods, which cross or intersect one another as shown at 3, there being a double eye clevis member 4, through the eyes of which the rods 1 and 2 pass. This clevis member 4 is provided with threaded thumb screws 5 and 6 to enter any of the depressions 7 and 8 in the bars 1 and 2 for holding them in adjusted positions. Upon the end portions 9 of the rods 1 and 2 are threaded members 10, to prevent the rods 1 and 2 from being pulled outwardly entirely from through the apertures 5ª and 6ª. The clevis member 4 is provided with a rearwardly extending lug 11, and pivoted upon the bolt 12 which passes through the lug 11, are the adjacent ends of the bars 13 and 14. The lug 11 is of a segmental shape and is provided with a series of apertures 15 arranged on an arc using the bolt 12 as a center. The adjacent portions of the bars or rods 13 and 14 are provided with apertures 16 and 17, and passing through the apertures and the required aperture 15 are cotter pins 18, to hold the bars 13 and 14 in different angular adjusted positions, so as to hold the scraper carrying bars 18 (to which the rods 13 and 14 are connected) in different angularly adjusted positions. One of the rods 13 and one of the rods 14 are adjustably connected at 19 to the bars 18, while the other of the rods 13 and 14 are pivotally connected at 20 to the bars 18. Adjustably mounted on the rods 1 and 2 by means of set screws 21 are sleeves 22, 23, 24 and 25, and to the sleeves 23 and 24 the bars 18 are connected by means of the chains 26, and to the sleeves 22 and 25 the bars 27 and 28 are connected by the chains 29. In this manner the bars 18, 27 and 28 are adjustable on the rods 1 and 2, so that the rods 1 and 2 may be moved toward each other or outwardly. Each of the rods 13 and 14 consist of two telescopical sections 30 and 31, held together and in adjusted positions by a set screw 32, so that the bars 18 may be more readily adjusted. Connected at 33 to the outer extremities of the rods 1 and 2, by means of chains are the outer bars 33 and 35, which are connected to the bars 27 and 28 by the telescopical sectional rods 36 and 37, the telescopical sections of which are held in adjusted positions by the set screws 38. The bars 27 and 28 are in turn connected to the bars 18 by the rods 39, which consist of telescopical sections 40 secured in adjusted positions by means of the set screws 41. The adjacent ends of the bars 18 are adjustably connected by means of the chain 42. The bars 27, 28, 34 and 35 are in turn connected by chains 43 to the bars 44, 45, 46 and 47, which are also disposed in an angular position. The bars 44 and 47 are connected to the bars 45 and 46 by the rods 48 and 49, which comprise telescopical sections 50 secured in adjusted positions by the set screws 51. The bars 45 and 46 are in turn connected to the bars 18 by the rods 52 and 53, each of which consists of two telescopical sections 54 held adjustably together by the set screws 55. Connected to the bars 44 and 47 by virtue of chains 56 are additional bars 57, the adjacent ends of which are adjustably connected by the chain 58, and the adjacent ends of the bars 45 and 46 are adjustably connected by the chain 59. The bars 57 are connected to the bars 45 and 46 by the rods 60 and 61, and these rods 60 and 61 each consist of two sections 62 telescopically connected, which are held adjustable to each other by means of the set screws 63. The various telescopical sectional rods are pivotally connected to their respective bars, so that the parts of the structure may be easily adjusted, and upon the under face of the various angularly arranged bars are scrapers or graders 64. Connected to the outer ends of the rods 1 and 2 are chains 65, which converge toward and are connected to a ring 66, which in turn is connected to an eye 67 of the clevis 4 by means of the chain 68. The ring 66 constitutes means whereby a suitable draft equalizer (not shown) may be connected, so that the road drag or grader may be drawn over the road or other surface for grading the same.

The invention having been set forth, what is claimed as new and useful is:—

In a road drag, a pair of rods adjustably crossing each other and arranged near horizontal alinement, means for adjustably connecting said rods where they cross, a plurality of sequentially connected bars extending rearwardly and angularly toward each other, the forward bars of which being adjustably connected to said intersecting rods, a plurality of telescopical sectional rods connecting said bars whereby the bars may be adjusted laterally, and means connected to the crossing rods for connection to draft means.

In testimony whereof I have signed my name to this specification in the presence of two subscribing witnesses.

GEORGE EDWARD SMITH.

Witnesses:
CHARLES KUGEL,
ARTHUR C. HONSKA.